United States Patent [19]
Marshall et al.

[11] 3,840,848
[45] Oct. 8, 1974

[54] MULTIPLE VEHICLE GAP DETECTION AND INTERVAL SENSING SYSTEM

[75] Inventors: Arthur N. Marshall; James W. Rinehart; Charles A. Gregory, Jr., all of Richmond, Va.

[73] Assignee: Traffic Safety Systems, Inc., Richmond, Va.

[22] Filed: Aug. 8, 1972

[21] Appl. No.: 278,821

[52] U.S. Cl. .............................................. 340/38 P
[51] Int. Cl. ............................................. G08g 1/04
[58] Field of Search ...... 340/31 R, 38 R, 38 P, 38 S

[56] References Cited
UNITED STATES PATENTS
| | | | |
|---|---|---|---|
| 3,141,612 | 7/1964 | Bolton | 340/38 S X |
| 3,167,739 | 1/1965 | Girard et al. | 340/38 P |
| 3,483,507 | 12/1969 | Griswold | 340/38 P |

FOREIGN PATENTS OR APPLICATIONS
| | | | |
|---|---|---|---|
| 1,294,726 | 5/1969 | Germany | 340/38 P |

Primary Examiner—William C. Cooper
Attorney, Agent, or Firm—Richard G. Wynne

[57] ABSTRACT

Beams of radiant energy, such as from infrared transmitters, are directed in paths downwardly onto a traffic lane to impinge upon associated receiver units that are transversely spaced in the roadway so that vehicles interrupt at least one of the beam paths in passing a fixed detector location. Upon interruption of any of the beam paths, the detector generates an output indicative of the presence of the vehicle. As the vehicle moves out of the beam path, the beam again impinges on the receiver, terminating the vehicle presence output, thus indicating passage of the rear of the vehicle. The vehicle presence outputs from the detectors are applied to a signal buffer arrangement operating as a logical OR circuit to generate a vehicle presence signal whenever the beam path to one or more of the detectors is interrupted and generates a signal when the vehicle leaves the detector. This vehicle presence signal is applied to actuate appropriate timing delay and logic circuitry that defines predetermined gap time intervals between passage of the rear of one vehicle and the front of a following vehicle in order to detect and signal unsafe or illegal "tailgating" conditions.

7 Claims, 4 Drawing Figures

PATENTED OCT 8 1974          3,840,848
SHEET 1 OF 2

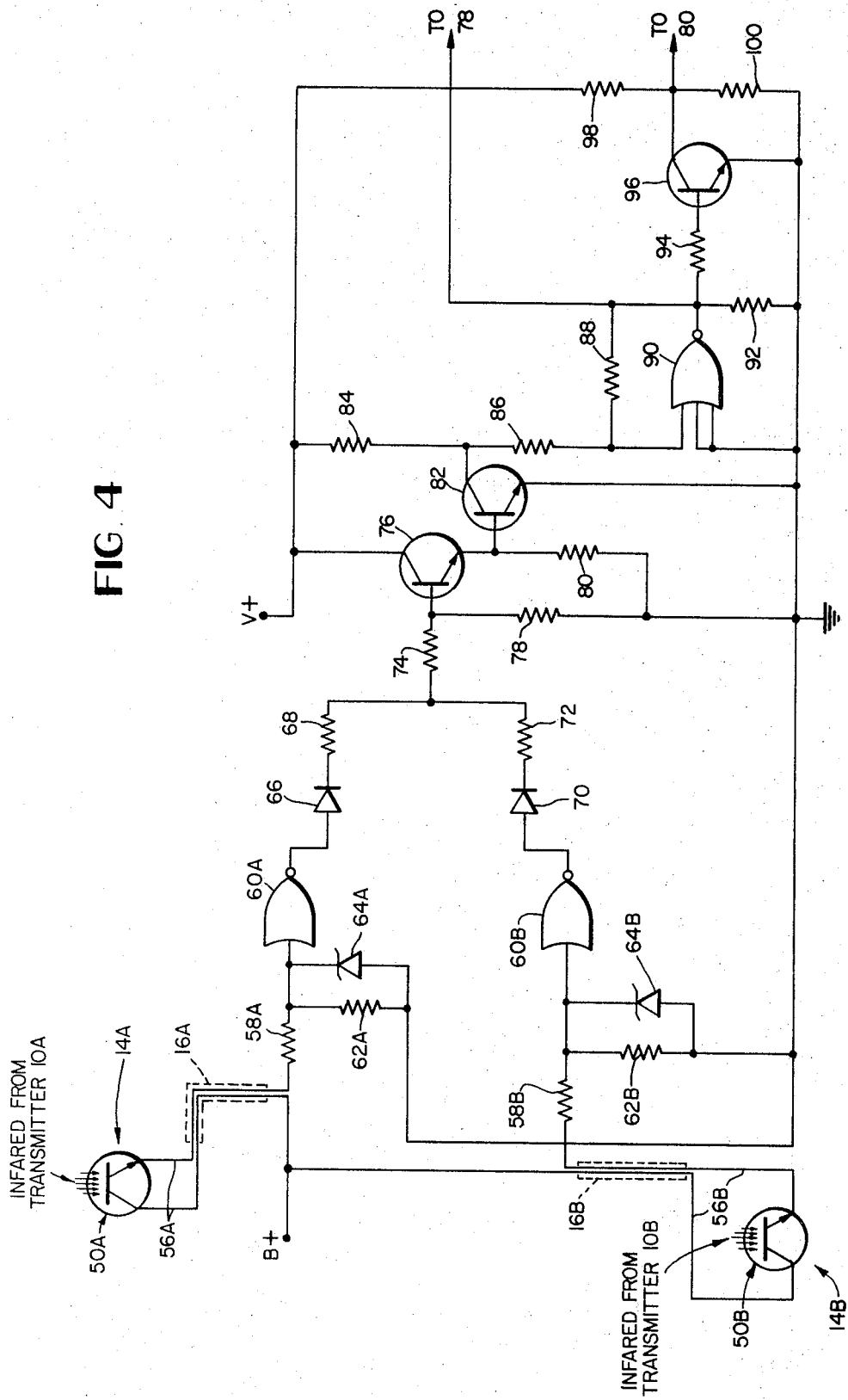

MULTIPLE VEHICLE GAP DETECTION AND INTERVAL SENSING SYSTEM

BACKGROUND OF THE INVENTION

1. Field of the Invention

This invention relates to improved multiple detector unit systems for sensing or signaling potentially unsafe gap time intervals between vehicles in a traffic lane, a practice known as "tailgating," and more particularly an improved system of this type employing multiple beam detectors for improving the reliability of the interval detection operation.

2. Background of the Invention

Recently, systems have been developed to study and attempt to solve the major traffic safety problems associated with vehicles following too closely or "tailgating," which is identified as a major cause of serious traffic accidents, particularly on freeways. High-speed rear-end collisions resulting from this practice cause property damage and serious personal injuries of the "whiplash" type. A previous system is described in the U.S. Pat. No. 3,618,003, issued Nov. 2, 1971, entitled "VEHICLE INTERVAL DETECTION AND SIGNALING SYSTEM."

More recently, improved systems of this type have been developed that employ precise beam radiation detection to measure more accurately the headway gap interval between the rear of one vehicle and the front of the following vehicle, and determine whether the measured interval complies with the prescribed safety standards with the degree of accuracy required for proper law enforcement. Such improved systems are described and claimed in the present applicant's co-pending patent application Ser. No. 130,382, filed Apr. 1, 1971 and entitled "PRECISION VEHICLE INTERVAL DETECTION AND SIGNALING SYSTEM."

Although achieving the necessary precision, the improved beam detection systems having only a single detector may, under certain conditions, permit vehicles either to avoid detection or to register false violation indications. For example, smaller vehicles with narrow wheel base may sometimes pass the detector without passing over the receiver unit in the roadway to interrupt the beam path. On the other hand, large trailer rigs and trucks with the cargo bed several feet above the roadway may pass over the receiver unit, but the beam angle from a source located in an elevated position alongside the road may permit the beam to pass uninterrupted below the trailer bed, thus falsely indicating passage of the rear of the vehicle. In that case, the beam is thereafter interrupted by the rear truck or trailer wheels, so that the system indicates a false "tailgating" violation when none existed. Finally, the system may falsely respond under certain conditions to ambient radiation reflected from hubcaps or other portions of the passing vehicle or surroundings during the time that the actual beam is interrupted, thus falsely indicating a gap where none exists. Although such erroneous detections occur only occasionally under unusual circumstances associated with a particular installation, and even then represent only a small proportion of correct indications, any error can severely jeopardize use of such systems in law enforcement if doubt is cast on the reliability of the evidence.

To avoid problems associated with the systems response to ambient radiation, the radiant beam detector unit should as much as possible be responsive only to radiations provided by the associated beam source. To accomplish this, the receiver units embedded in the roadway are provided with an appropriate focusing system, such as a lens and baffle arrangement, which must be precisely aligned so that the sensing element receives only such radiation as is produced within a narrow field of view that includes the beam source. This requires that the entire receiver unit be embedded in the roadway with great stability to maintain its position under the shock and weight from the tires of passing vehicles and to avoid dislodgement by the blade of snowplows or similar types of road equipment.

SUMMARY OF THE INVENTION

Improved gap interval detection systems of this invention employ a plurality, preferably two, radiant energy beam detection units aligned across a roadway lane with such receivers spaced transversely from one another to detect the presence of the vehicles passing the selected location. The detection units are positioned in the roadway lane relative to the beam sources, preferably of the infrared type, so that at least one of the beam paths between the source and its receiver is interrupted by a vehicle traveling in the traffic lane past the detector location. Signals from the detector units indicative of vehicle presence are applied to a signal buffer circuit to generate an output signal whenever the beam path for one or more of the detector units is interrupted. This multiple detector design not only prevents false and erroneous detections due to vehicle shape and size, but virtually eliminates false gap detections resulting from reflections and ambient radiation. In a preferred embodiment, the vehicle presence signal generated by combining the outputs of the detector units is applied to a solid state conditioning circuit to develop complementary switching signals for actuation of timing and delay logic circuitry, such as described in the aforementioned pending patent application.

In accordance with another aspect of the preferred embodiment of this invention, the cylindrical housing of the receiver units has a rectangular base plate formed or attached to extend radially outward from the bottom of the housing. Holes are provided in the four edges of the rectangular baseplate to allow the road surfacing material, such as asphalt or cement, to pass through when the unit is embedded in the roadway, thus forming a permanent bond between the material masses above and below the base plate. This holds the receiver unit in a precise fixed position relative to the beam sources even under heavy shock and vibration forces from passing vehicles. In addition, an upper peripheral flange on the housing has the inner portion of its upper surface surrounding the plexiglass cover plate beveled at an angle of about 20° to the road's surface so that the upper end of the detector unit can be positioned slightly above the surrounding roadway surface to prevent puddling of water or collection of other material that can interfere or mask the detector elements within the receiver unit and to prevent damage by snow plows or the like.

DETAILED DESCRIPTION

Figure 1:
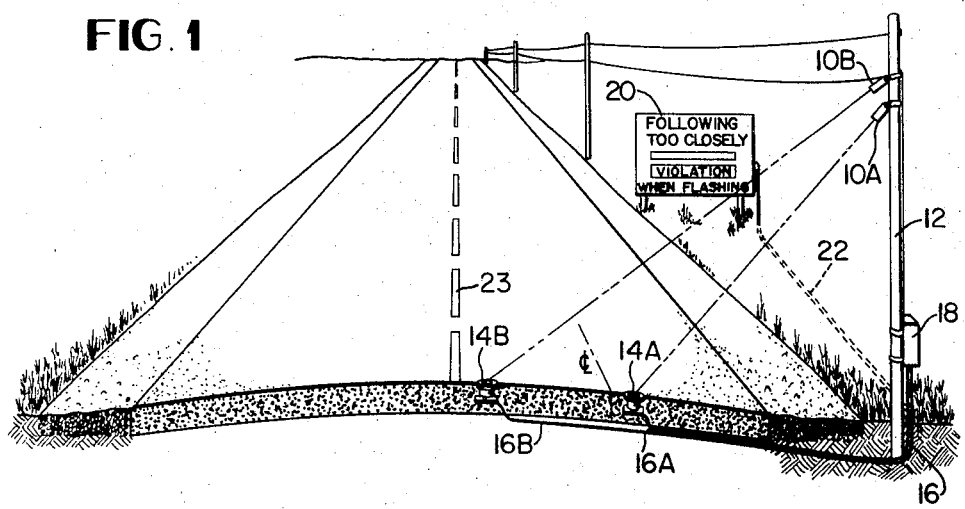
FIG. 1 is a perspective representation of a highway showing installation of a multiple detector system in accordance with the invention in a "side fire" arrangement wherein the radiation beam sources are mounted in elevated positions alongside the roadway.

Referring now to FIG. 1, a multiple beam detector system in accordance with the invention has two radiant energy sources 10A and 10B, preferably low cost infrared transmitters, mounted in elevated positions on a convenient utility pole, typically located alongside such roadways, to provide a "sidefire" installation for monitoring one traffic lane of a two lane thoroughfare. Alternatively, as hereinafter more fully discussed in connection with FIG. 2, such transmitters may more conveniently be mounted on overhead light standards, sign supports or overpass structures used on modern highways and freeways in overhead positions directly above the traffic lanes.

Each beam detector unit has a transmitter source 10A or 10B with its receiver 14A or 14B embedded in the roadway at a selected position. Under some circumstances, a single transmitter source can be employed with appropriate optical deflectors or the like for directing beams to both receivers 14A and 14B. In other circumstances, where it may be desirable to minimize erroneous responses due to particularly troublesome ambient conditions or reflections.

Figure 3:
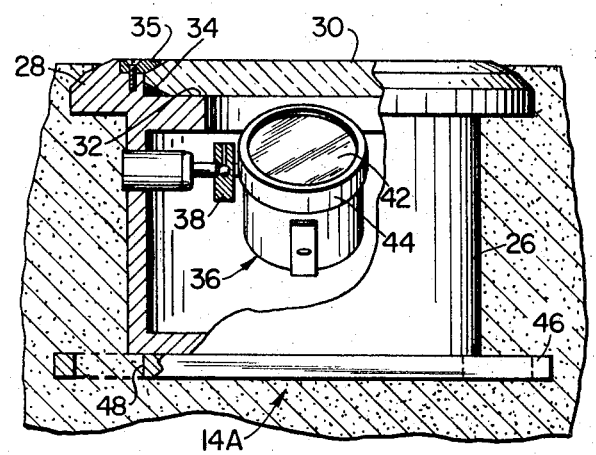
FIG. 3 is a side view, partially broken away in section, illustrating an improved construction of the detector unit to be embedded in the roadway for use in the system of the invention; and, FIG. 4 is a schematic circuit diagram of one preferred form of the circuitry to be employed in the system of the invention for generating the vehicle presence detection signals for actuating appropriate timing and delay logic circuitry.

The receivers, 14A and 14B, as more fully described in connection with FIG. 3, are embedded in the road with the flat upper surface just slightly above the adjacent road surface with a transparent cover exposed to be impinged upon by beams from the respective transmitters 10A and 10B. Receivers 14A and 14B are both aligned with the transmitters 10A and 10B in a plane normal to the direction of vehicle travel and transversely spaced apart in the traffic lane so that every vehicle traveling within the traffic lane, regardless of shape or size, interrupts the path of the beam to the receiver. As previously explained in the applicants' copending application, the transmitters 10A and 10B should be positioned to provide a relatively steep downward beam angle impinging on the flat transparent cover of the receivers 14A and 14B to avoid excessive reflection from the upper cover surface thereby insuring that sufficient beam energy reaches the photodetector sensing elements within. Separate underground cables 16A and 16B electrically couple the receivers 14A and 14B to a control box 18 that contains the system electronics and is also conveniently mounted on the utility pole 12. Electrical power for operating the transmitters 10A and 10B is supplied from the control box 18 which receives operating power for the entire system from an available A/C power line or a self-contained portable power supply (not shown). If desired, a warning sign 20 may be erected alongside or over the roadway in a suitable position to be easily viewed by a motorist in a vehicle at the detector location. Control signals and power for operating the sign 20 are supplied through an underground cable 22 from the control box 18. An appropriate audible signal, such as a horn or siren, may also be used with the sign for attracting the motorist's attention.

In a typical "sidefire" installation as shown in FIG. 1, the angle of the beam relative to the horizontal is preferably 45° or greater. For the beams crossing the roadway at approximately this angle, two detectors are generally sufficient for a normal traffic lane width of twelve feet. Typically the receiver unit 14A closest to the transmitters is located near the center line of the traffic lane, preferably 5 feet and 3 inches in from the road edge. The other receiver unit 14B is positioned near the far edge of the lane slightly inside the lane divider at the center of the roadway, preferably at a distance of 10 feet 6 inches from the roadway edge and thus eighteen inches inward from the lane divider 23. This provides adequate beam coverage over the roadway's surface so that any passing vehicle in the traffic lane interrupts at least one of the beams.

Figure 2:
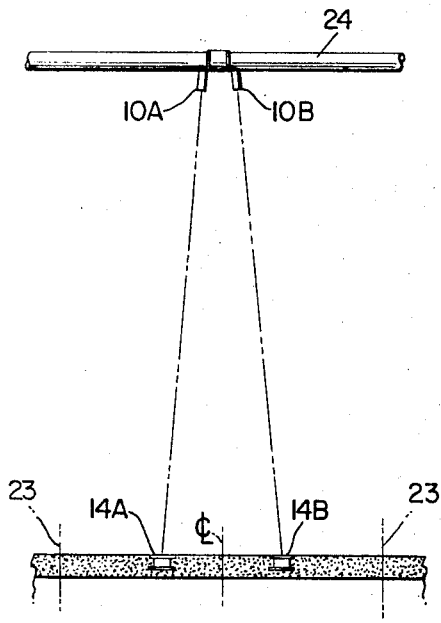
FIG. 2 is a partially broken away sectional view showing the preferred positioning of multiple detector units in accordance with the invention where the beam sources may be mounted directly overhead above the traffic lane.

Referring now to FIG. 2, an overhead installation typically has the beam transmitter or transmitters 10A and 10B mounted together on an overhead support 24 approximately above the roadway directly over the center line of the traffic lane. The receiver units 14A and 14B would then be embedded in the roadway symmetrically spaced about two feet and three inches from the center line on opposite sides, or about 3 feet and 9 inches inward from each lane edge or divider 23 in a typical 12 foot wide traffic lane.

Referring now to FIG. 3, the functional elements of the receiver units 14A and 14B for use in the preferred form of this invention are enclosed within a cylindrical protective housing 26 with closed lower end and an open upper end surrounded by supporting flange 28. A flat undersurface on the supporting flange 28 serves to support the upper end of the protective housing 26 within the surrounding road surfacing material to resist movement due to the weight and vibration of passing vehicles. The upper surface of the supporting flange 28 has an outer beveled surface formed at an angle of approximately 45°together with an adjacent inner portion beveled at an angle of 22½° relative to the horizontal. The housing 26 is placed in the roadway with the surrounding road surface material reaching a level approximately midway along the inner beveled surface. This allows the top surface of the unit to extend slightly above the road surface to prevent puddling of water and collection of other materials that might interfere with the beam detection, while providing a sufficiently flat angle so that snowplow blades and similar road maintenance equipment do not catch and tend to dislodge or reorient the unit.

A cover plate 30 consisting of a disc or transparent plastic material, such as plexiglass, has its outer periphery beveled on both sides. Cover plate 30 is received within a circular opening at the top of the housing 26 to rest on a supporting inner flange 32. A compressible O-ring seal is clamped between the supporting flange 32 and the lower beveled edge of cover plate 30 which is held by a retainer ring 35 which seats in the top of the housing 26 at the upper peripherary of the circular inner opening andis held by screws. This forms an airtight closure preventing the entry of water or other troublesome materials such as dust. Within the housing 26, a photodetector assembly 36 is pivotally mounted on a ball joint swivel 38 to permit rotation to obtain the desired alignment for receiving the beam from the associated transmitter 10A or 10B. After alignment, the swivel 38 is locked in position with a set screw or the like. As previously explained in the applicants'copending applciation, a focusing lens 42 at the upper end of the hollow photodetector casing is held in position by a retainer cap 44 with internal threading for engaging external threads on the casing. The focusing lens 42 serves to focus the radiant energy from the beam on to the photosensitive element within the casing.

To increase the positional stability of the receiver units in the roadway, a rectangular base plate 46, preferably about 7 inches square, is attached to or formed at the bottom of the cylindrical housing 26 to extend radially outward. Vertical holes 48, which may be approximately 1 inch in diameter, are formed at each of the corners to allow the road surfacing material used in embedding the unit to flow freely through forming a permanent bond between the material above and below the plate 46 adjacent the holes 48. This serves to provide greater stability for the lower end of the receiver unit against dislodgement by the weight or vibration of passing vehicles.

Referring now to FIG. 4, the photodetector circuits for the multiple detector system in the preferred form of this invention each have a photodetector element 50A or 50B contained within the receiver unit 14A or 14B. The terminals of the photodetector element connected by leads 56A and 56B are through the cables 16A and 16B to the remaining circuitry and power supply sources at a remote location within control box 18. In this case, the photodetector elements 50A and 50B consist of a phototransistor selectively responsive to the infrared energy focused thereon from the transmitters 10A and 10B. For example, the transmitters 10A and 10B may be of the conventional type that projects radiant energy generated by an ordinary incandescent lamp in a beam through a planar filter material that removes the visible light portion of the spectrum to permit only the invisible infrared to be directed outwards towards the receiver. Such transmitters are readily available with various suitable units being widely used in conventional infrared detection systems for industrial use and need not be described in further detail herein.

In such an arrangement, the phototransistors 50A and 50B, preferably of the type sold under the designation LS 600 by Texas Instruments Inc. or the like, each have their collector terminal coupled to a B+ voltage supply (typically a positive 24 volts) provided for the control box circuitry, while the emitter terminal is coupled through an input resistor 58A or 58B to a respective NOR logic gate 60A or 60B. NOR logic gates 60A and 60B merely act as inverters to change the low level signal indicative of vehicle presence when the beam is interrupted to a positive or true output. The emitters of phototransistors 50A and 50B are each also connected to ground or common potential through a high valued resistor 62A or 62B typically in the order of one hundred kiloohms and the voltage amplitude of the input is limited by a zener diode 64A or 64B connected in parallel.

Without the infrared energy beam from the source impinging on the phototransistor element 50A or 50B, the resistance between its collector and emitter is quite high. The high phototransistor impedance is coupled in series with that of the resistor 62A or 62B providing a voltage divider for the B+ supply and the common terminal of the divider is coupled to the input of the respective NOR logic gate 60A or 60B. With no vehicle present to interrupt the beam, the phototransistor impedance is relatively low thus providing a true or high level voltage signal to the NOR logic gate 60A or 60B. Both detectors thus normally provide a true signal level at the output of their respective NOR logic gates 60A and 60B with a vehicle present and a false signal level indicating the absence of a vehicle. Each receiver operates independently of the other and the signals generated may be applied through a selector switch (not shown) which permits use of either individually or together simultaneously.

The output of NOR gate 60A is coupled through diode 66 and a resistor 68 to an input resistor 74 at the base of transistor 76. Similarly the output of NOR gate 60B is applied through diode 70 and resistor 72 to the input resistor 74. With the resistor 78 coupling the emitter to ground this operates as a diode signal buffer or logical OR gate to deliver a high or true level input through resistor 74 to the base of the transistor 76 when the output from either or both of the NOR gates 60A or 60B is high or true to indicate presence of a vehicle. Thus the input to transistor 76 will always be true if there is a vehicle present to interrupt the beam of either or both detector units and false only if there is no vehicle present to interrupt the beam of either.

Transistor 76 has its collector coupled to a V+source and its emitter connected through an output resistor 80 to ground to operate as an emitter follower to deliver an uninverted signal to the base of transistor 82, which has its emitter coupled to ground and its collector to V+ through an output resistor 84. Transistor 82 acts as an inverter stage to deliver an inverted signal through dropping resistor 86 to the input of a NOR logic gate 90, which has a signal stabilizing feedback resistor 88 coupling its input and output in series with an output resistor 92. The output from NOR gate 90 is applied through input resistor 94 to the base of switching transistor 96 which has its collector coupled to the common point a pair of voltage divider resistors 98 and 100 between V+ and ground. When transistor 96 is rendered conducting in saturation by a high or true level output from NOR gate 90 the lower divider resistor 100 is effectively shorted to provide a low or false level output for the succeeding timing and delay logic. On the other hand, when transistor 96 is cut off, the voltage across the lower divider resistor 100 is at the high or true level. A complementary output signal is provided directly from the output of NOR gate 90 for use in actuating the timing and delay logic circuits, which preferably include the circuit arrangement shown in FIGS. 5, 6, & 7 of the aforementioned copending patent application.

Thus, with a vehicle over the sensor a false input is delivered to NOR logic gate 90 so that it generates a true level on the upper and a false level is generated on the lower output to be transmitted to the NOR logic gates of the timing and delay circuitry. In the case of the absence of a vehicle for either detector, the input to NOR logic gate 90 is true to generate a false level on the upper output line and a true level on the lower output line.

We claim:

1. In a system for detecting and indicating unsafe intervals between successive vehicles traveling in a common traffic lane on a roadway, the improvement comprising:

a plurality of vehicle detector means including a plurality of radiant energy receivers positioned at transversely spaced locations across said traffic lane to define a fixed detector location along a line normal to the direction of vehicle travel and means for transmitting a beam of radiant energy to each of said receivers to be interrupted by a vehicle present at said fixed detector location, said vehicle detector means being infrared detectors, said transmitting means constituting an infrared source in an elevated position relative to the roadway for directing a beam of radiant energy toward said receivers, and said receivers being embedded in the roadway each including a photosensitive element and means for focusing impinging infrared energy from the source on said element;

a receiver circuit means coupled to each receiver for generating an output signal indicative of vehicle presence whenever said beam is interrupted; and, a signal buffer circuit coupled to receive the output signal from each of said receiver circuit means to generate a vehicle presence signal whenever the beam to at least one of said receivers is interrupted.

2. In a system for detecting and indicating unsafe intervals between successive vehicles traveling in a common traffic lane on roadway, the improvement comprising:

a plurality of vehicle detector means including a plurality of radiant energy receivers positioned at transversely spaced locations across said traffic lane to define a fixed vehicle detector location along a line normal to the direction of vehicle travel and means for transmitting a beam of radiant energy to each of said receivers to be interrupted by a vehicle present at said fixed detector location, said receivers including at least first and second receiver units embedded in said roadway, the first at a position adjacent the center line of said traffic lane spaced therefrom toward said transmitting means and the second at a position on the opposite side of said centerline adjacent the far edge of said traffic lane, and said transmitting means being located in an elevated position alongside said roadway, whereby the beams of radiant energy to said first and second receiver units cross said traffic lane at an acute angle so that one or both are interrupted by any vehicle present at said fixed detector location;

a receiver circuit means coupled to each receiver for generating an output signal indicative of vehicle presence whenever said beam is interrupted; and, a signal buffer circuit coupled to receive the output signal from each of said receiver circuit means to generate a vehicle presence signal whenever the beam to at least one of said receivers is interrupted.

3. In a system for detecting and indicating unsafe intervals between successive vehicles traveling in a common traffic lane on a roadway, the improvement comprising:

a plurality of vehicle detector means including a plurality of radiant energy receivers positioned at transversely spaced locations across said traffic lane to define a fixed detector location along a line normal to the direction of vehicle travel and means for transmitting a beam of radiant energy to each of said receivers to be interrupted by a vehicle present at said fixed detector location, said transmitting means being located in an elevated position approximately above the centerline of said traffic lane and said receivers including at least first and second receiver units embedded in said roadway in positions equidistant from and on opposite sides of the centerline of said traffic lane and spaced apart approximately half the width of said traffic lane;

a receiver circuit means coupled to each receiver for generating an output signal indicative of vehicle presence whenever said beam is interrupted; and, a signal buffer circuit coupled to receive the output signal from each of said receiver circuit means to generate a vehicle presence signal whenever the beam to at least one of said receivers is interrupted.

4. In a system for detecting and indicating unsafe intervals between successive vehicles traveling in a common traffic lane on a roadway, the improvement comprising:

a plurality of vehicle detector means including plurality of radiant energy receivers positioned at transversely spaced locations across said traffic lane to define a fixed detector location along a line normal to the direction of vehicle travel and means for transmitting a beam of radiant energy to each of said receivers to be interrupted by a vehicle present at said fixed detector location, each of said receiving units having a hollow circular housing with its axis aligned perpendicular to the adjacent roadway surface and a sensing assembly adapted to be rotatable within said housing to be aligned in a vertical plane with said transmitting means and including a sensing element and means for selectively focusing radiant energy from said transmitting means upon said sensing element, and having a plate affixed to the bottom of said housing and extending radially outward from the periphery thereof with a plurality of apertures formed therein for permitting the surfacing material of said roadway to flow therethrough upon embedding;

a receiver circuit means coupled to each receiver for generating an output signal indicative of vehicle presence whenever said beam is interrupted; and, a signal buffer circuit coupled to receive the output signal from each of said receiver circuit means to generate a vehicle presence signal whenever the beam to at least one of said receivers is interrupted.

5. The system improvement of claim 4 wherein: said receiver unit further comprises:

a transparent plate sealing the upper end of said housing for admitting said radiant energy to said focusing means; and wherein said housing has an annular flange extending radially outward at the upper periphery of said housing with a central circular opening for receiving and fixedly supporting said transparent plate to lie in a radial plane circular to the roadway surface, the upper surface of said flange having an outer portion and an inner inwardly beveled portion surrounding said plate with an angle of said approximately 22° relative to the radial plane of said transparent plate, said housing being embedded in said roadway with the upper roadway surface partially covering said inner beveled portion of said flange.

6. In a system for detecting an unsafe headway gap between successive vehicles traveling in a common traffic lane on a roadway, an improved vehicle detector means comprising:

radiant energy receiver means embedded in a roadway to define a fixed detector location along a line normal to the direction of vehicle travel;

transmitting means for directing radiant energy downwardly across said roadway to impinge on said detector means so that means at said fixed detector location interrupt the path of radiant energy from said transmitting means;

said receiver unit means including hollow cylinder housing means adapted to be embedded in the roadway with its axis aligned perpendicular to the adjacent roadway surface;

a sensing assembly adapted to be rotatably mounted within said housing means in precise alignment with said transmitting means, said assembly including a sensing element and means for selectively focusing upon said sensing element only that radiant energy directed toward said receiver means from a narrow field of view inclusive of said transmitting means; and, a plate attached to the bottom of said housing and extending radially outward from the periphery thereof with a plurality of apertures formed therein to permit road surfacing materials to flow through during embedding.

7. The improved vehicle detector means of claim 6 wherein said receiver unit further comprises:

transparent plate means sealing the upper end of said housing for admitting said radiant energy from said narrow field of view, including said transmitting means, to said focusing means; and, an annular flange upon said housing extending radially outward at the upper periphery of said housing and having a sensor circular opening for receiving and fixedly supporting said perpendicular plate, the upper surface of said flange having an outer portion and an inner beveled portion adjacent said plate with an angle of approximately 22° relative to the lateral plane of said transparent plate, whereby said housing is adapted to be embedded in said roadway with the upper roadway surface partially covering said inner beveled portion of said flange.

* * * * *